Aug. 19, 1969  T. W. WINSTEAD  3,461,496
APPARATUS FOR EXTRUDING A SKIN COVERED, FOAMED THERMOPLASTIC
Filed Nov. 8, 1965
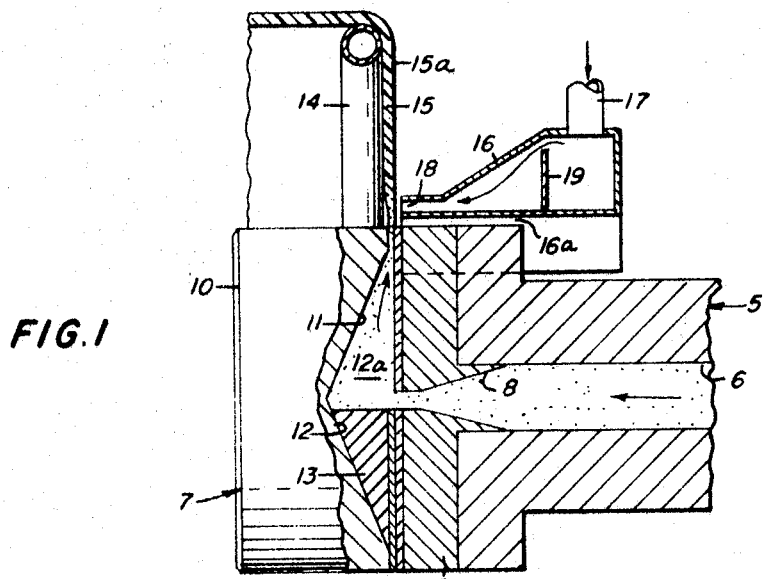
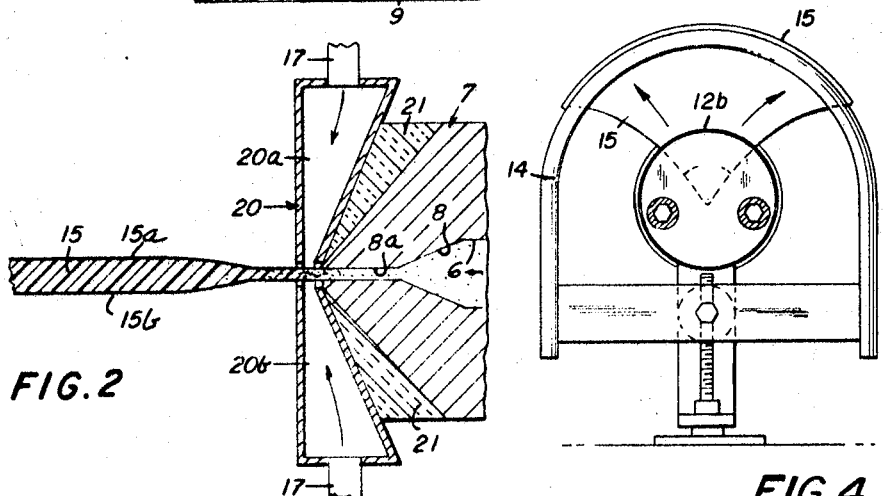
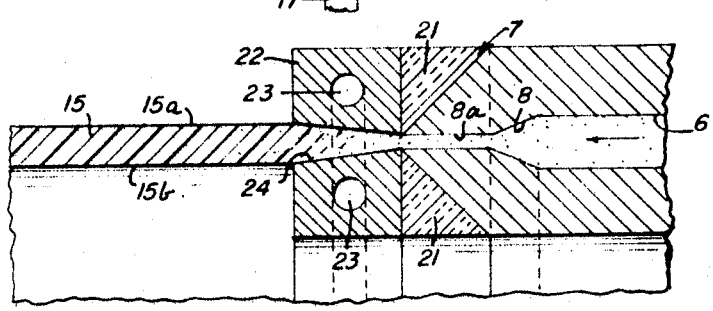
INVENTOR
THOMAS W. WINSTEAD
BY Raphael Semmes
ATTORNEY

United States Patent Office 3,461,496
Patented Aug. 19, 1969

3,461,496
APPARATUS FOR EXTRUDING A SKIN COVERED, FOAMED THERMOPLASTIC
Thomas W. Winstead, Baltimore, Md.
(Williamson Lane, Cockeysville, Md. 21030)
Filed Nov. 8, 1965, Ser. No. 506,805
Int. Cl. B29f 3/08; B29g 7/02
U.S. Cl. 18—12                                    11 Claims

ABSTRACT OF THE DISCLOSURE

Apparatus for extruding a sheet of foamed thermoplastic material having an expanded, cellular, inner structure and a thin, unexpanded, molecularly integrated skin of the same material covering at least one side thereof. The apparatus includes a die head having an elongated die orifice through which foamed thermoplastic is extruded, and immediately posterior to the die orifice, there is provided means for chilling one or both surfaces of the extrudate to prevent foaming thereof and form an integrated skin. The apparatus also includes means to prevent heat exchange between the chilling means and the die lips.

---

This invention relates to apparatus for extruding foamed thermoplastic material and is directed more particularly to the production of an extrudate of thermoplastic material having an expanded, cellular, inner structure and a relatively thin, unexpanded skin of the same material, molecularly integral with the expanded structure, covering at least one surface of the extrudate for reinforcing and stiffening purposes.

In a related application for U.S. patent filed concurrently herewith, Ser. No. 506,804, I have described articles manufactured of this skin covered, foamed, plastic material, and the present application covers a method and apparatus which is suitable for producing the sheet material from which such articles may be formed.

As explained in my said related application, these foamed thermoplastics may include polyvinylchloride, polystyrene, polyethylene and polypropylene as the basic material to be extruded, and, ordinarily, volatile liquids, such as pentane, trichlorofluoromethane or other suitable materials which are somewhat soluble in certain thermoplastics, are added to the charging stock. This material will remain in the liquid phase under certain temperatures and pressures, and when the pressure is reduced at the extrusion die, the liquids form a gas which, when the material is extruded, causes the thermoplastic to foam in a cellular structure.

I have found that by controlling the temperature of one or both surfaces of a foamed thermoplastic sheet immediately after it is extruded, such surface or surfaces can be prevented from expanding and foaming. For example, when it is desired to produce a sheet or layer of foamed thermoplastic having one surface coated with an unexpanded skin, the cooling of said surface by any suitable means, such as a cooled plate, the application of cool air, or other adaptable cooling means, immediately after the sheet leaves the extrusion die lips, but before actual expansion or foaming takes place, the cooled surface of the sheet forms a skin-like covering which is molecularly an integral part of the underlying foamed resin, as distinguished from interfaces, laminates or bonded layers.

There are several conventional methods which undertake to apply a surface having certain desirable characteristics to a foamed substrate. For example, one such method employing styrene involves the use of an adhesive and laminating system to join a biaxially oriented styrene sheet to a foamed substrate. This is not only a more expensive method, but it does not result in an integral structure such as contemplated by the present invention.

Another conventional technique is that of extruding the skin through a flat die and utilizing the heat of extrusion to join the skin to the surface of a foamed sheet fed under the die and between pinch rolls. Because the extruded skin cannot be oriented without reducing the temperature below the point suitable for good adherence to the foamed substrate, the resulting combinaion is particularly weak and brittle, especially in the case of styrene. For this reason, an impact grade of styrene is frequently used for the skin, but this inherently involves a higher cost and precludes good optical clarity because of the modifier present.

Still another approach has been to extrude a tube and collapse it just as it has passed between pinch rolls where it is laminated with a skin of impact or oriented material. Here again, there are a number of limitations with respect to cost and properties, including the difficulty of maintaining low densities while simultaneously providing a good bond between the skin and the substrate.

It is therefore the primary object of the present invention to provide apparatus which overcomes the above-noted disadvantages and by means of which a sheet or tube of foamed thermoplastic may be extruded and simultaneously provided on one or both surfaces thereof with a relatively thin, unexpanded skin of the same material, molecularly integral with the expanded or cellular structure.

Another object of the invention is to provide apparatus of this character which is readily adaptable to conventional extrusion apparatus of the type employed for extruding flat sheets or employing dies of other configurations, such, for example, as a standard tubing die of the type currently used in the manufacture of thermoplastic tubing or pipe.

A further object is to provide apparatus designed to provide extruded sheets or tubes having skins of high density, while, at the same time, having the material adjacent to the skins of densities as low as one pound per cubic foot or less without difficulty.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is a fragmentary, sectional view of one form of extrusion head and surface cooling means embodying the invention;

FIG. 2 is a similar view of a modified form of the invention;

FIG. 3 is a sectional view of a further modified form of the invention; and

FIG. 4 is an end view showing the extrusion die and mandrel, illustrating an extruded sheet of foamed thermoplastic passing over the mandrel.

As previously stated, this invention may be adapted to extrusion dies of various types and configurations. For example, as shown in FIG. 1, the invention may be used in connection with an extrusion head generally similar to that shown in my copending application Ser. No. 475,734, filed July 29, 1965, now Patent No. 3,387,328, issued June 11, 1968, where, as shown in FIG. 4 of the present drawings instead of utilizing a die having the usual flat die face, a die lip arrangement is employed wherein the discharge slot or orifice is arcuate in shape and is fed from a feed chamber which diverges from a substantially central inlet point to the arcuate die lips. This arrangement is designed to provide a uniform distribution of pressure flow at all points along the lip of the die and thereby eliminate strains or distortions in the extrudate, which is not possible with a conventional flat surface die.

Referring to FIG. 1 of the drawings, 5 represents an extruder body having a longitudinally extending central passageway 6 fed from a suitable source of molten plastic (not shown). The discharge end of the passageway or barrel 6 passes through an extruder head 7 and preferably terminates in communication with a converging inlet port 8 located centrally of a circular die lip 9. An end cap 10, also circular in shape, registers with the die lip 9 and is secured in place by any suitable means, and the inner face of this end cap is conically recessed as at 11, providing a feed chamber 12 which is coaxial with the passageway 6 and converging opening 8. This chamber has diverging side walls which terminate in slightly axially and inwardly spaced relation to the periphery of the end cap 10. An adaptor 13 conforms substantially to the surface contour of the chamber 12, with the exception that the upper portion thereof is provided with a V-shaped cutout area 12a which, when the adaptor is installed, provides diverging radial confines for the chamber 12, providing a substantially fan-shaped reservoir of which the upper portion of the circular lip 9 forms the opposite wall, defining arcuate die lips 12b (FIG. 4), all as shown in my said Patent No. 3,387,328.

Also, as described in my said patent, to facilitate the control of the extrudate after leaving the die lips, a mandrel 14 is provided adjacent the die lips 12b. This mandrel preferably comprises a vertically disposed, transversely arcuate tube which is supported in an upright position so that as the extrudate 15 leaves the die lips, it is spread laterally and supported so as to provide a maximum possible accommodation of the widthwise expansion of the extrudate.

In applying the surface cooling means of the present invention to this type of extrusion head, an arcuate housing 16 is mounted immediately adjacent the discharge orifice from the extrusion chamber 12a. The housing is fed through tube 17 from a suitable source of cooled air or gas (not shown), and preferably converges at its discharge end to form an arcuate discharge slot 18 which is directed against the adjacent surface of the extrudate 15. Preferably, a baffle 19 is provided in the housing 16 to facilitate uniformity of the flow of the cooling medium. As the extrudate 15 progresses from the extrusion chamber 12a, it expands rapidly. However, the surface which has been chilled to the desired degree remains unexpanded and provides an integral skin 15a, the thickness of which is directly controlled by the degree of cooling which has been provided through means of the cooling housing 16. While the skin expands laterally, it does not undergo a three-dimensional expansion and remains as a molecularly integral covering for the underlying foamed resin 15. The skin covered extrudate may then be processed in a suitable forming apparatus, either vacuum or blow molding, to produce a variety of foamed plastic articles.

In may be pointed out that the slot 18 is designed to facilitate the discharge of a high velocity, uniform flow of air or other cooling gas upon the adjacent surface of the extrudate to form the desired skin. The amount of gas, its rate of flow, temperature, and the rate of extrusion are all variables contributing to the thickness of the skin.

Preferably, an air space 16a is provided between the housing 16 and the extrusion head to maintain the proper cooling temperature in the housing and to avoid cooling the extruder head and die.

In the form of the invention illustrated in FIG. 2, the die head 7 is provided with transversely straight die lips forming a die orifice 8a. Mounted on the discharge end of the die head is a cooling housing 20 which, in the form illustrated, defines two converging cooling chambers 20a and 20b, fed from a source of cooling gas or air through tubes 17. Insulating blocks 21 are interposed between the hot extrusion head 7 and the walls of the housing 20 to maintain the desired cooling effect of the gas or air directed onto opposite surfaces of the extrudate 15, so that, as the extrudate leaves the die lips and passes between the two converging discharge slots of chambers 20a and 20b, both surfaces are chilled so as to prevent expansion and to provide the integral skin coverings previously referred to, as at 15a and 15b.

It will be understood that it is only one surface of the extrudate is desired to be skin covered, only one of the chambers 20a or 20b will be put into operation.

In addition to these conventional cooling mediums for producing the integral skin covering on the extrudate, a conductive method of cooling may be employed. Such an embodiment is illustrated in FIG. 3 which, although specifically showing a tubular extrusion head for extruding a tubular extrudate, is also applicable to the extrusion of a flat sheet of expanded theremoplastic. In FIG. 3, the discharge end of the extrusion head 7 is provided with an annular cooling ring 22 having passageways 23 for conducting a cooling fluid. As in the structure shown in FIG. 2, this device includes insulating blocks 21 between the extrusion head and the ring 22 to maintain the full effect of the cooling medium without cooling the extrusion head.

In this form of the invention, a diverging, annular mouth 24 communicates directly with the discharge end of the extrusion orifice 8a, and, as the tubular extrudate 15 passes through this mouth, both surfaces are cooled to the desired degree by the cooling effect of the ring 22, thus providing an extrudate with integral, unexpanded skins 15a and 15b on opposite surfaces thereof. Here again, if a skin covering is desired on only one surface of the extrudate, only one of the cooling passageways 23 is put into use. As previously indicated, this same system may be employed for extruding a flat sheet insead of a tubular extrudate.

Preferably, the conductive surface or surfaces of the mouth 24 are coated with polytetrafluorethylene or a similar low friction coating which will not materially inhibit heat transfer.

The divergence of the mouth 24 permits some expansion of the extrudate even as its surface is being chilled. However, a flat mouth or a partially flat and partially divergent mouth may be employed.

The present invention is applicable to thermoplastic extrudates containing undissolved blowing agents, such as gas under pressure, and is also particularly applicable to themoplastic extrudates containing dissolved blowing agents, such as, for example, as styrene containing pentane. In the case of undissolved blowing agents, the method as employed prevents the expansion of cells near the surface of the extrudate by chilling the surface just as it emerges from the die lips to a sufficiently low temperature to cause such an increase is viscosity that the thermoplastic will not flow to accommodate cell growth even as the pressure on the extrudate is reduced to atmospheric. In the case where a dissolved blowing agent has beeen incorporated, the method provides for chilling the surface in a similar manner, but the dissolved blowing agent is prevented, in the first place, from forming gas cells because the increase in viscosity and decrease in temperature at the surface of the extrudate actually reduce the boiling point of the incorporated blowing agent to a level where it remains in its liquid phase. Since the cooling must be sufficient to have its effect in both cases before pressure reduction of the extrudate, after emergence from the die lips permits the formation or growth of cells, it is important that the linear rate of extrusion be relatively high and the skin cooling take place immediately adjacent the lip or orifice of the die.

The invention contemplates skin coverings in the order of .001 to .005 inch on an extrudate, for example, .100" thick and, in this connection, there are several interesting effects which no other method of applying a skin formation to foam sheet materials can provide. Since the cells form very rapidly in the material upon emergence from the die, the thermal insulating value increases to a proportional degree. Therefore, the cooling effect on the surface does not materially affect the temperature of the foam extrudate below the surface. As a result, 90% or more of the total thickness of the foam material remains sufficiently hot and pliable for subsequent forming operations, even though the skin's surface has been chilled sufficiently to prevent its expansion. Because the skin is relatively thin, it can still be stretched in forming operations in spite of the fact that its temperature may actually be below optimum forming levels.

Another interesting effect can be achieved by suitable control of the variables involved, and this has to do with orientation of the skin which, in the case of styrene, is particularly important to the overall strength of the final extrudate or formed product. Biaxial orientation occurs because the skin has been chilled to a point where further stretching causes molecular orientation. As previously pointed out, even though the skin is relatively cool, it is a small percentage of the total extrudate thickness, and is therefore oriented as the growth of cells within the structure causes a considerable stretch of the extrudate in both transverse and longitudinal directions.

Instead of a separate surface cooling unit, it is also contemplated within the spirit of the invention to embody within the die lip itself a completely thermally isolated section for chilling the surface of the extrudate before emergence from the die lips.

From the foregoing, it is believed that the invention may be readily understood by those skilled in the art without further description, it being borne in mind that numerous changes may be made in the details disclosed without departing from the spirit of the invention as set forth in the following claims.

I claim:

1. Apparatus for extruding thermoplastic material to form a foamed plastic extrudate having an expanded inner structure and an unexpanded skin of said plastic, molecularly integral with at least one surface of said extrudate, said apparatus comprising a die head assembly, a plastic feeding passageway for molten plastic having a foaming agent in said assembly, said passageway communicating at its discharge end with die lips providing an elongated die orifice, means immediately posterior to said die orifice, disposed along at least one side thereof for chilling the adjacent surface of the extrudate as it emerges from said orifice to prevent expansion of the extrudate at said surface and form a molecularly integral, non-cellular skin thereon, means to prevent chilling of said die head and the lips of said die orifice, and means posterior to said die head assembly for laterally spreading the extrudate.

2. Apparatus as claimed in claim 1, wherein said chilling means comprise a housing fed from a source of gaseous cooling medium, and discharge means from said housing directed against at least one surface of the extrudate from said extrusion chamber, immediately adjacent the extrusion orifice.

3. Apparatus as claimed in claim 1, wherein said chilling means comprise an element having a surface contiguous with at least one lip of said die orifice, and means for cooling said element to chill at least one surface of said extrudate by conduction.

4. Apparatus as claimed in claim 3, wherein said die orifice is of annular contour and said cooling element comprises an annular ring immediately adjacent said orifice.

5. In apparatus for extruding an expandable thermoplastic strip, a die head assembly having an extrusion chamber therein, a plastic feeding inlet leading into said chamber, a transversely arcuate die orifice communicating with said chamber, a spreading yoke of arcuate contour substantially concentric with the axis of said arcuate die orifice, located in substantially the same plane as said orifice and radially spaced therefrom a distance which is calculated to accommodate the transverse expansion of said strip after it leaves said orifice, and means immediately posterior to said die orifice, disposed along at least one side thereof for chilling the adjacent surface of the extrudate as it emerges from said orifice, whereby said chilled surface remains unexpanded and provides a molecularly integral skin.

6. Apparatus as claimed in claim 5, wherein said chilling means comprises a cooling housing having an arcuate discharge slot discharging immediately on the surface of said extrudate, and means for feeding cooled fluid to said housing.

7. Apparatus as claimed in claim 6, wherein said cooling housing and discharge slot are coaxial with said die head and discharge slot.

8. Apparatus as calimed in claim 7, including an air space between said cooling housing and die head to thereby avoid cooling the die head and die orifice.

9. Apparatus as claimed in claim 1, wherein said chilling means comprises a conductive cooling body.

10. Apparatus as claimed in claim 1, wherein said die lips are transversely straight to extrude a strip, and said chill preventing means comprises a thermal insulating block interposed between chilling means and at least one of said die lips.

11. Apparatus as claimed in claim 1, wherein said chill preventing means comprises a thermal insulating block interposed between chilling means and at least one of said die lips.

References Cited

UNITED STATES PATENTS

| 2,597,553 | 5/1952 | Weber | 18—12 |
| 2,702,408 | 2/1955 | Hartland | 18—12 X |
| 2,736,064 | 2/1956 | Rubin | 18—12 X |
| 3,038,205 | 6/1962 | Plummer | 18—12 X |
| 3,068,517 | 12/1962 | Blackmore | 18—14 |
| 3,167,814 | 2/1965 | Corbett | 18—14 |
| 3,222,719 | 12/1965 | Wagner et al. | 18—12 |
| 3,229,005 | 1/1965 | Reifenhauser | 18—12 X |
| 3,331,103 | 7/1967 | Fox | 18—14 |

WILLIAM J. STEPHENSON, Primary Examiner